(12) United States Patent
Karay et al.

(10) Patent No.: US 10,711,670 B2
(45) Date of Patent: Jul. 14, 2020

(54) MUFFLER

(71) Applicant: ORBITAL AUSTRALIA PTY LTD, Balcatta, Western Australia (AU)

(72) Inventors: Stephen John Karay, Scarborough (AU); Mario Charles Muscat, Ballajura (AU); Pouria Mehrani, Darch (AU)

(73) Assignee: ORBITAL AUSTRALIA PTY LTD, Balcatta, Western Australia ( * ) Notice: Subject to any disclaimer, the term of this patent is extended or adjusted under 35 U.S.C. 154(b) by 45 days.

(21) Appl. No.: 15/736,876

(22) PCT Filed: Jun. 17, 2016

(86) PCT No.: PCT/AU2016/000211
§ 371 (c)(1),
(2) Date: Dec. 15, 2017

(87) PCT Pub. No.: WO2016/201489
PCT Pub. Date: Dec. 22, 2016

(65) Prior Publication Data
US 2019/0024548 A1    Jan. 24, 2019

(30) Foreign Application Priority Data
Jun. 17, 2015   (AU) ................................ 2015902309

(51) Int. Cl.
*F01N 1/02*     (2006.01)
*F01N 1/08*     (2006.01)
(Continued)

(52) U.S. Cl.
CPC ............ *F01N 1/083* (2013.01); *F01N 1/003* (2013.01); *F01N 1/023* (2013.01); *F01N 13/002* (2013.01);
(Continued)

(58) Field of Classification Search
CPC .......... F01N 1/026; F01N 1/083; F01N 1/084; F01N 1/089; F01N 13/002; F01N 13/1833
See application file for complete search history.

(56) References Cited

U.S. PATENT DOCUMENTS 823,115 A * 6/1906 Gramm ................... F01N 1/084
                                                         181/265
858,455 A    7/1907 Hedstrom
(Continued)

FOREIGN PATENT DOCUMENTS

EP      0705961 A1    4/1996
EP      1348844 A2   10/2003
WO  WO-2009/009119 A1    1/2009

OTHER PUBLICATIONS

International Search Report and Written Opinion for EP16810601 dated Oct. 29, 2018.
(Continued)

*Primary Examiner* — Edgardo San Martin
(74) *Attorney, Agent, or Firm* — Harness, Dickey & Pierce, P.L.C.

(57) ABSTRACT

A muffler devised particularly for a small, reciprocating-piston two-stroke internal combustion engine of the type used on unmanned aerial vehicles. The muffler comprises a body incorporating an inlet, an outlet, and a plurality of chambers for exhaust gas flow from the inlet to the outlet. The body is configured to present a compact profile for installation on the engine. The chambers are so configured that adjacent chambers communicate to facilitate exhaust gas flow from the inlet to the outlet via flow passages. The various chambers comprise an inner chamber, an outer chamber, and one or more intervening chambers disposed between the inner and outer chambers. The various chambers are disposed one about another in annular formation.

(Continued)

This arrangement creates a long flow path from the inlet to the outlet incorporating various directional changes.

23 Claims, 9 Drawing Sheets

(51) Int. Cl.
  *F01N 1/00* (2006.01)
  *F01N 13/18* (2010.01)
  *F01N 13/00* (2010.01)
  *B64C 39/02* (2006.01)

(52) U.S. Cl.
  CPC ..... *F01N 13/1833* (2013.01); *F01N 13/1894* (2013.01); *B64C 39/024* (2013.01); *B64C 2201/044* (2013.01)

(56) References Cited

U.S. PATENT DOCUMENTS

| | | | | |
|---|---|---|---|---|
| 1,338,520 A * | 4/1920 | Moores | ............... | F01N 1/06 181/253 |
| 1,598,578 A * | 8/1926 | Maxim | ............... | F01N 1/084 181/265 |
| 1,601,137 A | 9/1926 | Maxim | | |
| 1,613,322 A * | 1/1927 | Goetz | ............... | F01N 1/084 137/522 |
| 1,709,426 A * | 4/1929 | Beery | ............... | F01N 1/084 137/527 |
| 2,908,344 A | 10/1959 | Maruo | | |
| 2,975,854 A * | 3/1961 | Bakke | ............... | F01N 1/089 181/239 |
| 3,680,660 A * | 8/1972 | DuBois | ............... | F01N 1/003 181/250 |
| 3,685,616 A | 8/1972 | Malkiewicz | | |
| 6,199,658 B1 * | 3/2001 | Huff | ............... | F01N 1/06 181/265 |
| 6,684,633 B2 * | 2/2004 | Jett | ............... | F02B 27/04 60/312 |
| 6,959,782 B2 * | 11/2005 | Brower | ............... | F01N 1/02 181/238 |
| 7,942,239 B2 | 5/2011 | Huff et al. | | |
| 2004/0245044 A1 * | 12/2004 | Cerrato-Jay | ............... | F01N 1/02 181/268 |
| 2005/0023078 A1 * | 2/2005 | Brower | ............... | F01N 1/02 181/272 |
| 2010/0270103 A1 | 10/2010 | Huff et al. | | |

OTHER PUBLICATIONS

International Search Report and Written Opinion of the ISA for PCT/AU2016/000211, ISA/AU, Woden ACT, dated Aug. 22, 2016.
Written Opinion (2) of the IPEA, IPEA/AU, Woden ACT dated Jun. 7, 2017.
International Preliminary Report on Patentability, Ch. II, IPEA/AU, Woden ACT, dated Oct. 3, 2017.

* cited by examiner

MUFFLER

CROSS-REFERENCE TO RELATED APPLICATIONS

This application is a 371 U.S. National Stage of International Application No. PCT/AU2016/000211, filed Jun. 17, 2016, which claims the benefit of and priority to Australian Patent Application No. 2015902309, filed Jun. 17, 2015. The disclosures of the above applications are incorporated herein by reference.

TECHNICAL FIELD

This invention relates to a muffler for an internal combustion engine to reduce engine noise emission.

The invention relates more particularly to a compact muffler intended for use with small internal combustion engines, particularly reciprocating piston engines.

The invention has been devised particularly, although not necessarily solely, for use with small, reciprocating piston two-stroke engines of the type used on unmanned aerial vehicles (UAVs), although it can of course also be used on any other appropriate internal combustion engine

BACKGROUND ART

The following discussion of the background art is intended to facilitate an understanding of the present invention only. The discussion is not an acknowledgement or admission that any of the material referred to is or was part of the common general knowledge as at the priority date of the application.

There is often a requirement for mufflers intended for use with small internal combustion engines to be of compact and relatively lightweight construction. This can be particularly so for an engine of a UAV, where there are likely to be space and weight constraints within the UAV fuselage.

Further, reciprocating piston two-stroke engines can be sensitive to what is arranged on the exhaust side of the engine. More particularly, there is a need for an appropriate level of backpressure to be imposed upon the exhaust flow from a combustion chamber of a reciprocating piston two-stroke engine to inhibit escape of air/fuel mixture introduced into the combustion chamber prior to closing of an exhaust outlet port.

However, excessive backpressure can be detrimental to engine performance. In order to avoid excessive backpressure, there is often a need to prevent accumulation of deposits within a muffler on the exhaust side of such an engine, as such deposits can lead to restriction of exhaust flow through the muffler, potentially creating an undesirable level of backpressure to exhaust flow from the engine.

Reciprocating piston two-stroke engines are typically regarded as being engines which output significant noise, this noise arising from the propagation and radiation of acoustic pulses generated by the combustion process. For certain applications of such engines, including for an engine of a UAV, there may be a need for compliance with certain regulations, standards or specific user requirements regarding the level of noise emitted by the engine. Thus, there may be a need for control of engine exhaust noise through suppression of the acoustic pulses generated by the combustion process.

Accordingly, there may be various functional requirements of a muffler in order for it to be suitable for a reciprocating piston two-stroke engine of a UAV.

It is against this background that the present invention has been developed. However, it should be understood that the invention need not be limited to a muffler for a reciprocating piston two-stroke engine of a UAV. The muffler may find application in relation to other engines, including four-stroke engines. The muffler may also find application in relation to internal combustion engines for other apparatus, including for example hand-held tools such as chainsaws.

SUMMARY OF INVENTION

According to a first aspect of the invention there is provided a muffler comprising a body defining a plurality of chambers disposed one about another, the plurality of chambers being defined between two opposed side walls, each chamber being separated from a respective adjacent chamber by a common wall therebetween, an inlet for delivery of exhaust gas into one of the chambers and an outlet for discharge of exhaust gas from another of the chambers, adjacent chambers being interconnected for exhaust gas flow from the inlet to the outlet, the plurality of chambers comprising an inner chamber and an outer chamber, an opening in one side wall, the opening being aligned with and communicating directly with an adjacent portion of the inner chamber, the cross-sectional area of the opening being smaller than the cross-sectional area of the portion of the inner chamber with which it communicates, wherein the inlet or the outlet comprises the opening, each chamber communicating with a respective adjacent chamber for exhaust gas flow therebetween through one or more flow passages in the respective common wall between the two adjacent chambers, the one or more flow passages in each common wall having a combined cross-sectional flow area greater than the cross-sectional flow area of the outlet through which exhaust gas is discharged, and wherein the body has length, breadth and depth dimensions, the depth dimension being smaller than the length and breadth dimensions, and the depth dimension being less than half the breadth dimension.

Further, there may be one or more intervening chambers disposed between the inner and outer chambers.

The chambers may be disposed one about another in the sense that each chamber which is disposed about another chamber is configured to at least partly, and preferably fully, surround said another chamber.

Preferably, each chamber configured to surround another chamber is of annular formation. In other words, each chamber configured to surround another chamber may be seen as a band girding the other chamber. For ease of reference, each such chamber will hereinafter be referred to as an annular chamber.

The term annular as used herein refers to a ring configuration for which the outer and inner peripheries need not necessarily be circular. Accordingly, all points on the outer periphery of each annular chamber need not necessarily be points equidistant from a fixed point (the centre), and similarly all points on the inner periphery also need not necessarily be points equidistant from a fixed point (the centre). In other words, each annular chamber may have inner and outer boundaries which need not necessarily be concentric, although they can be.

Each annular chamber may be completely annular, or partly annular. A chamber of partly annular configuration may, for example, be pene-annular or semi-annular.

When partly annular, the chambers may be defined by an annular space divided into segments.

As stated above, each chamber is separated from an adjacent chamber by a common wall. The common wall may be configured as a closed loop. Consistent with matters discussed above in relation to the annular chamber, the closed loop may be of any appropriate configuration. For example, the closed loop may be circular, oval, elliptical, stadium, or of any other appropriate configuration including a freeform configuration with varying radii along the curve of the closed loop.

The plurality of chambers may comprise the inner chamber and one or more annular chambers disposed about the inner chamber.

The inner chamber would typically comprise a closed volume defined by a peripheral wall; that is, the inner chamber would not typically comprise an annular chamber.

The outer chamber would typically comprise an annular chamber surrounding the inner chamber and any intervening chambers which typically would also comprise annular chambers.

Preferably, the inlet and outlets each respectively communicate with one of the inner and outer chambers.

The outlet may communicate with one of the inner or outer chambers either directly or indirectly. The outlet may communicate directly with the chamber concerned by, for example, opening directly onto that chamber. Alternatively, the outlet may communicate indirectly with the chamber concerned by way of, for example, an intermediate zone disposed between the chamber concerned and the outlet, whereby the chamber concerned is in communication with the intermediate zone, and the intermediate zone is in turn in communication with the outlet. Such an arrangement may afford enhanced noise attenuation benefits, resulting from the presence of the zone providing a transition space between the chamber concerned and the outlet.

In a particular embodiment, the inlet communicates with the inner chamber and the outlet communicates with the outer chamber. However, other configurations may be implemented; for example, the inlet may communicate with the outer chamber and the outlet may communicate with the inner chamber.

The chamber into which the inlet opens may be of a larger volume than the other chambers. Typically, this would comprise the inner chamber.

Each chamber communicates with an adjacent chamber for exhaust gas flow via at least one flow passage. There may however be more than one flow passage providing flow communication between adjacent chambers.

The one or more flow passages permitting exhaust gas flow between two adjacent chambers may comprise flow opening(s) in the common wall between the two adjacent chambers.

The flow opening(s) may be of any appropriate configuration; for example, a hole in the form of an aperture, an orifice or a slot.

Preferably, each flow passage permitting exhaust gas flow between two adjacent chambers comprises a plurality of flow openings operating in concert. A plurality of flow openings operating in concert may be advantageous over a single opening, as the arrangement would typically provide a larger cumulative perimeter and thereby afford better noise attenuation for the same amount of backpressure within the muffler. In other words, a plurality of flow openings operating in concert may optimise the perimeter of openings between the adjacent chambers to provide better noise attenuation.

The flow opening(s) at which exhaust gas enters a respective chamber may be offset from the flow opening(s) at which the exhaust gas leaves that chamber. Having the openings arranged in this offset manner serves to force the exhaust gas flow to undergo a directional change as it progresses from one chamber to the next, this directional change being beneficial for improved noise attenuation effect.

Each chamber may present one or more internal flow paths for exhaust gas flowing through the chamber, wherein the combined cross-sectional flow area of the one or more internal flow paths is preferably greater than the cross-sectional flow area of the outlet through which exhaust gas is discharged from the muffler. By way of example, in the case of an annular chamber where an incoming flow would typically split and flow along two separate arcuate paths (defined by opposing sectors of the annular chamber), the combined cross sectional flow area would be the sum of the cross-sectional flow areas of the two arcuate flow paths. In another case where, for example, there might be a partition within the annular chamber to constrain flow within the annular chamber to one direction, the combined cross-sectional flow area would simply be the cross-sectional flow area of the sector of the annulus corresponding to that one direction.

Sizing of the cross-sectional flow areas of the internal flow paths within the various muffler chambers relative to the cross-sectional flow area of the outlet affords a degree of redundancy for the purpose of avoiding an adverse effect on performance of an engine fitted with the muffler through normal accumulation of deposits within the muffler chambers.

As stated above, the one or more flow passages permitting exhaust gas flow between two adjacent chambers have a combined cross-sectional flow area greater than the cross-sectional flow area of the outlet through which exhaust gas is discharged from the muffler. By way of example, in the case where there is more than one flow passage, the combined cross-sectional flow area would be the sum of the cross-sectional flow areas of the various passages. In the other case where there is only one flow passage, the combined cross-sectional flow area would simply be the cross-sectional flow area of that one flow passage.

Sizing of the cross-sectional flow areas of the flow passages between adjacent muffler chambers relative to the cross-sectional flow area of the outlet also serves to provide a degree of redundancy for the purpose of avoiding any adverse effect on performance of an engine fitted with the muffler through normal accumulation of deposits within the flow passages.

The outlet may comprise a single outlet opening or a plurality of outlet openings. The cross-sectional flow area of the outlet may comprise the cross-sectional flow area of the single outlet opening, or the combined cross-sectional flow area of the plurality of outlet openings, as the case may be.

The cross-sectional flow area of the outlet may be sized to provide a selected restriction to discharge of exhaust gas from the muffler. The cross-sectional flow area of the outlet may be selected having regard to required engine performance and/or noise attenuation requirements.

The outlet may comprise a venturi. This may be beneficial in terms of noise attenuation.

The body may also incorporate the inlet and the outlet.

The body may comprise a shell defining a hollow interior, and portions within the hollow interior to define internal walls between the various chambers.

The shell may be of two-part construction adapted to be assembled together.

In one arrangement, the shell defining the hollow interior, and the portions within the hollow interior to define internal walls between the various chambers, may comprise an integrated assembly.

In another arrangement, the portions within the hollow interior defining the internal walls may comprise elements formed separately of the shell and configured as inserts receivable within the shell.

At least one, and preferably all, of the portions defining the internal walls may be thermally isolated from the shell. This can be achieved by, for example, forming the shell and the portions defining the internal walls from different materials.

Thermally isolating the portions defining the internal walls from the shell may be beneficial in terms of reduced accumulation of exhaust deposits within the chambers.

The arrangement involving provision of the portions as elements separately of the shell, and configured as inserts receivable within the shell, is advantageous. Firstly, such an arrangement may be conducive to construction of the shell and the portions defining the internal walls from different materials. Secondly, an arrangement of this type may allow selection of different wall materials and/or different wall thicknesses between the muffler chambers.

Adoption of different materials, and/or different wall thicknesses, may allow the design operating temperature within the muffler to be manipulated according to selected criteria to achieve a "burn-off" temperature quickly, thereby inhibiting accumulation of exhaust deposits within the chambers.

By way of example, the shell may be formed of a cast material such as a metal alloy, and the inserts may be of a different material, such as for example stainless steel which can "run hotter" and thereby facilitate deposit "burn-off".

The body is preferably configured to present a compact profile for installation on an engine. More particularly, the body is preferably configured to present a flat or squat profile for installation on an engine. A muffler with a flat/squat or 'pancake package' profile of this type would typically have a depth dimension for the body being smaller than the general length and breadth dimensions of the body.

Preferably, the body of the muffler is configured such that the depth thereof is less than half the breadth thereof (or where the muffler is generally circular in nature, less than half of the diameter of the flat profile presented by the body of the muffler). More preferably, the body of the muffler is configured such that the depth thereof is up to about one quarter the breadth thereof.

The flat profile of the body of the muffler is in part facilitated by the plurality of chambers within the body being disposed one about another to provide a compact design. Preferably, the compact muffler design facilitates the radial or lateral flow of gas within the muffler from the inlet to the outlet. This radial or lateral flow of gas is in contrast to the typical axial flow of gas that would be the norm in larger mufflers where compactness of design was not critical and the outlet is located a notable distance from the inlet (i.e. as would typically be the case where long lengths of pipe or long chambers are used to provide some noise attenuation benefit).

According to a second aspect of the invention there is provided a muffler comprising a body defining an inlet for receiving exhaust gas, an outlet for discharge of exhaust gas, an inner chamber, an outer chamber and at least one intervening chamber between the inner and outer chambers, the intervening chamber(s) and the outer chamber being configured as annular chambers disposed about the inner chamber, adjacent chambers being separated by a common wall and interconnected for fluid communication by one or more flow passages in the common wall, the one or more flow passages in each common wall having a combined cross-sectional flow area greater than the cross-sectional flow area of the outlet through which exhaust gas is discharged, the chambers being defined between two opposed side walls, one side wall having an opening therein communicating with an adjacent portion of the inner chamber, the cross-sectional area of the opening being smaller than the cross-sectional area of the portion of the inner chamber with which it communicates, wherein the inlet or the outlet comprises the opening, and wherein the body has length, breadth and depth dimensions, the depth dimension being smaller than the length and breadth dimensions, and the depth dimension being less than half the breadth dimension.

According to a third aspect of the invention there is provided amuffler comprising a body defining an inlet for receiving exhaust gas, an outlet for discharge of exhaust gas, an inner chamber, an outer chamber and at least one intervening chamber between the inner and outer chambers, the intervening chamber(s) and the outer chamber being configured as annular chambers disposed about the inner chamber, adjacent chambers are separated by a respective common wall and interconnected for fluid communication by one or more flow passage in the common wall, the one or more flow passages in each common wall having a combined cross-sectional flow area greater than the cross-sectional flow area of the outlet through which exhaust gas is discharged, wherein the body comprises a shell defining a hollow interior and portions within the hollow interior to define the common walls between the chambers, the shell comprising two opposed side walls between which the chambers are defined, one side wall having an opening therein communicating with an adjacent portion of the inner chamber, the cross-sectional area of the opening being smaller than the cross-sectional area of the portion of the inner chamber with which it communicates, wherein the inlet or the outlet comprises the opening, and wherein the body has length, breadth and depth dimensions, the depth dimension being smaller than the length and breadth dimensions, and the depth dimension being less than half the breadth dimension.

The body may also define the inlet and the outlet, or at least portions of the inlet and the outlet.

The shell may be of two-part construction adapted to be assembled together.

In one arrangement, the shell defining the hollow interior, and the portions within the hollow interior to define internal walls between the various chambers, may comprise an integrated assembly.

In another arrangement, the portions within the hollow interior defining the internal walls may comprise elements formed separately of the shell and configured as inserts receivable within the shell.

According to a fourth aspect of the invention there is provided an internal combustion engine fitted with a muffler according to the first, second or third aspect of the invention.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

Figure 1:
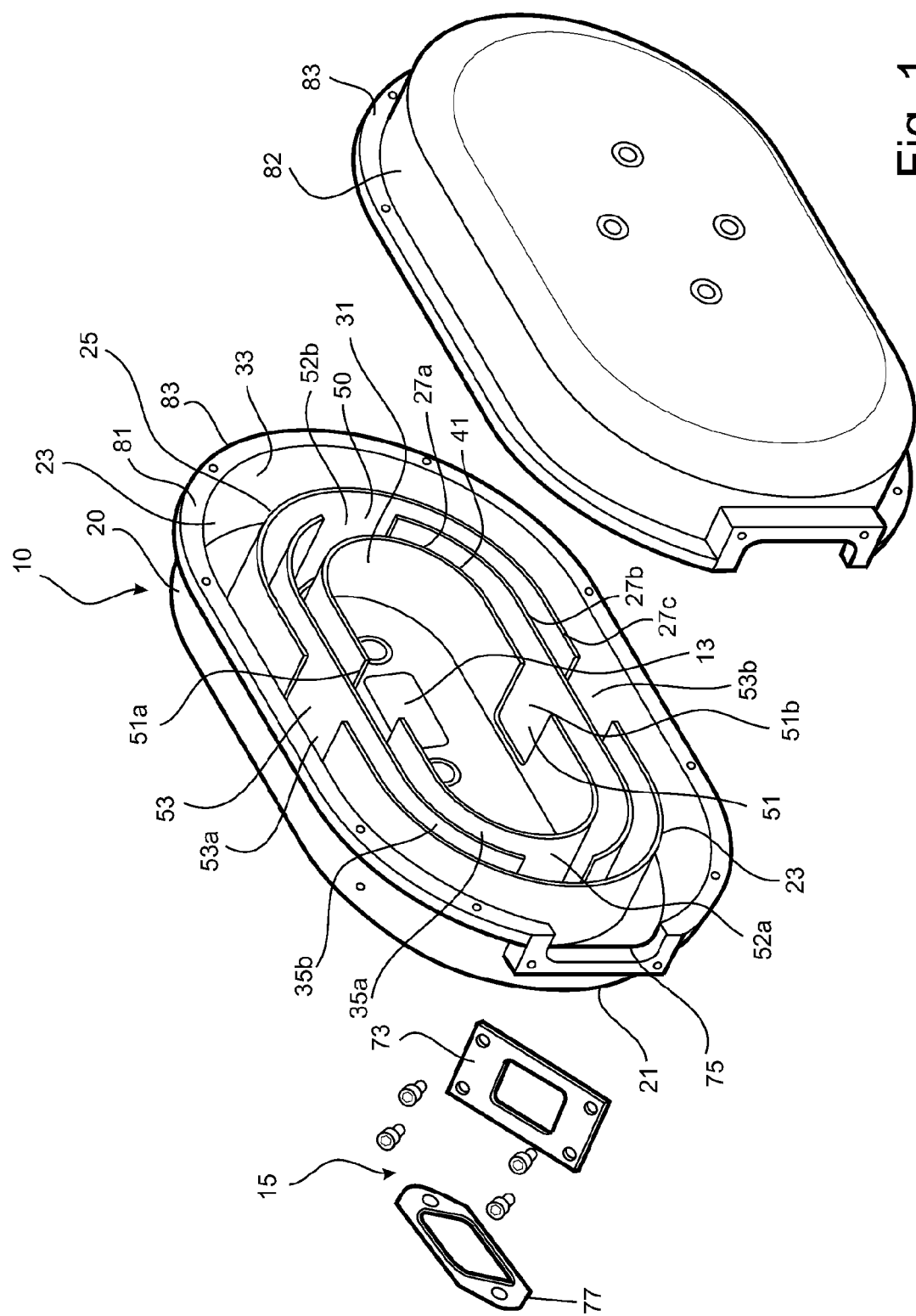
FIG. 1 is an exploded perspective view of a first embodiment of the muffler.
Figure 2:
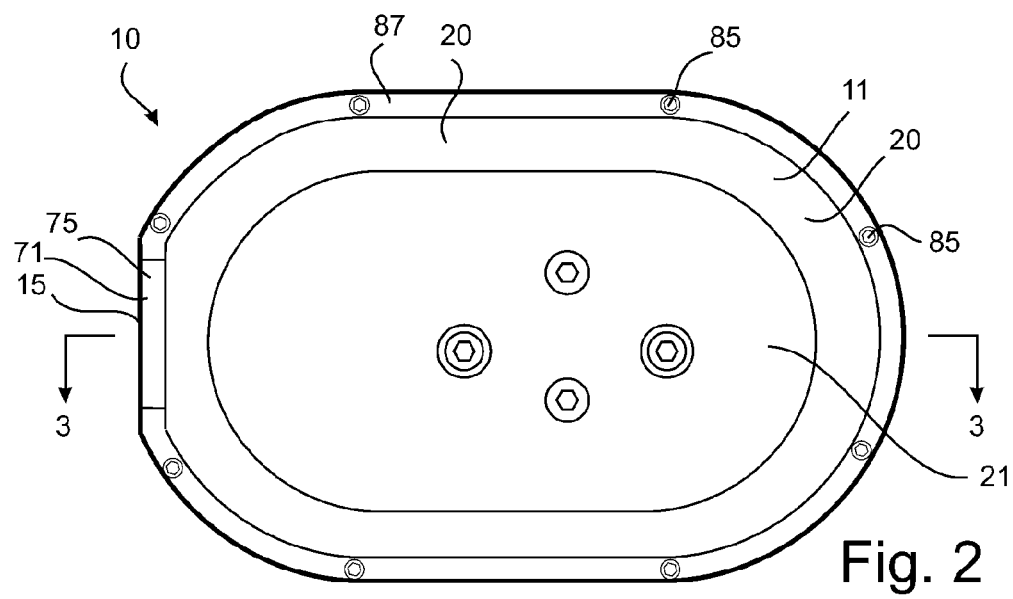
FIG. 2 is a side view of the muffler shown in FIG. 1.
Figure 3:
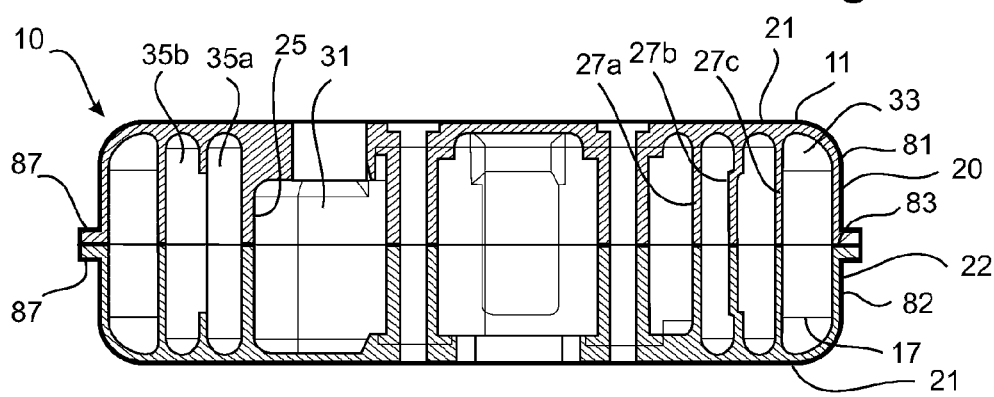
FIG. 3 is a sectional view along line 3-3 of FIG. 2.

The drawings shown are not necessarily to scale, with emphasis instead generally being placed upon illustrating the principles of the present invention.

The figures depict several embodiments of the invention. The embodiments illustrate certain configurations; however, it is to be appreciated that the invention can take the form of many configurations, as would be obvious to a person skilled in the art, whilst still embodying the present invention. These configurations are to be considered within the scope of this invention.

DESCRIPTION OF EMBODIMENTS

The embodiments shown in the drawings are each directed to a muffler 10 for a small, reciprocating piston two-stroke internal combustion engine of the type used on unmanned aerial vehicles (UAV).

Referring to FIGS. 1 to 4, there is shown a first embodiment of a muffler 10 according to the invention. The muffler 10 comprises a body 11 incorporating an inlet 13, an outlet 15, and a plurality of chambers 17 for exhaust gas flow from the inlet to the outlet. The chambers 17 are arranged and configured for suppression of the acoustic pulses generated by the combustion process in the engine.

The body 11 is configured to present a compact profile for installation on the engine, thereby satisfying a functional requirement of the muffler with respect to space constraints within the UAV fuselage.

The body 11 comprises a shell 20 having two side walls 21 and an outer peripheral wall 22 extending between the two side walls. With this arrangement, the body 11 generally has length, breadth and depth dimensions.

The body 11 is configured to have a flat or squat profile, facilitating the compact profile for installation on the engine. In the arrangement shown, this is accomplished by configuring the body 11 such that the depth thereof (as represented, for example, by the distance between the exterior sides of the two side walls 21) is less than half the breadth thereof (as represented by, for example, the distance between two directly opposed points on the outer peripheral wall 22). More preferably, the body 11 is configured such that the depth thereof is up to about one-quarter the breadth thereof. Where the body 11 is of oblong configuration, as is the case in the arrangement shown, the length may be considered to be the longer (longitudinal) dimension of the body and the breadth may be considered to be the shorter (transverse) dimension of the body. Where the body 11 is circular in side profile, the length and breadth dimensions are each represented by the diameter of the circular side profile.

The shells 20 defines a hollow interior 23 and portions 25 within the hollow interior to define internal walls 27 between the various chambers 17. The portions 25 within the hollow interior 23 defining the internal walls 27 are formed integrally with the shell 20. In another arrangement, the portions 25 defining the internal walls 27 may comprise one or more elements formed separately of the shell 20 and configured as inserts receivable within the shell 20.

The various chambers 17 comprise an inner chamber 31, an outer chamber 33, and one or more intervening chambers 35 disposed between the inner and outer chambers. In this embodiment, there are two intervening chambers 35a, 35b.

Figure 4:
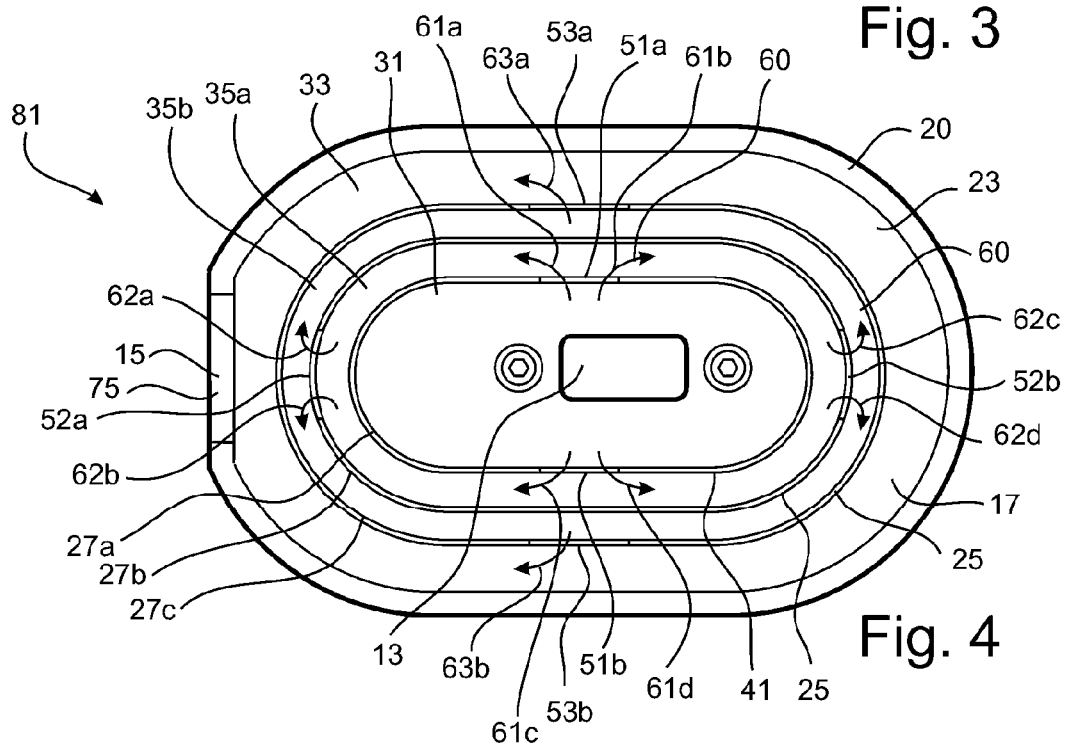
FIG. 4 is a side view of a part of the muffler, illustrating portions of internal chambers within the muffler.

The various chambers 17 are disposed one about another. In the arrangement shown, each chamber 17 disposed about another chamber is configured to surround that chamber. Specifically, in the arrangement shown, the inner chamber 31 is surrounded by first intervening chamber 35a, which in turn is surrounded by second intervening chamber 35b, which in turn is surrounded by outer chamber 33, as best seen in FIG. 4. In the arrangement shown, the various chambers 17 are also shown as being concentric about the same central point, although this need not be the case as other arrangements are of course possible. Furthermore, each chamber 17 disposed about another chamber need not necessarily be configured to entirely surround that chamber; for example, each chamber disposed about another chamber may be configured to only partly surround that chamber.

Each chamber 17 configured to surround another chamber is of annular formation. In other words, each chamber 17 configured to surround another chamber may be seen as a band girding the other chamber. For ease of reference, each such chamber will hereinafter be referred to as an annular chamber. The term annular as used herein refers to a ring configuration, as explained previously.

In this embodiment, the two intervening chambers 35a, 35b and the outer chamber 33 (each of which is a chamber configured to surround another chamber) constitute annular chambers.

The inner chamber 31 comprises a closed volume defined by peripheral wall 41 which comprises the innermost wall 27a of the internal walls 27. In other words, the inner chamber 31 is a closed spaced defined by the innermost internal wall 27a and is not an annular chamber.

Each chamber 17 is separated from an adjacent chamber by a common wall which comprises a respective one of the internal walls 27. In this embodiment, the internal walls 27 are each configured as a closed loop. In the arrangement shown, the internal walls 27 are each of an oblong configuration formed by joining two semicircles to opposite ends of two parallel lines, as best seen in FIG. 4; that is, the internal walls 27 are each configured as the perimeter of a geometric figure known as a stadium. Other configurations of the internal walls 27 are of course possible, including for example, circular, oval, and elliptical configurations, and also a freeform configuration with varying radii along the curve of the closed loop. Further, adjacent internal walls 27 need not necessarily be of the same configuration (although they are of the same configuration in this embodiment). In other embodiments, adjacent internal walls 27 may be of different configurations; for example, one internal wall may be configured as the perimeter of a geometric figure known as a stadium and an adjacent internal wall may be of freeform configuration.

The flat or squat profile of the body 11 is in part facilitated by the plurality of chambers 17 within the body being disposed one about another to provide a compact design. The compact muffler design facilitates the radial flow of gas within the muffler from the inlet 13 to the outlet 15. This radial flow of gas is in contrast to the typical axial flow of gas that would be the norm in larger mufflers where compactness of design was not critical and the outlet is located a notable distance from the inlet (i.e. as would typically be the case where long lengths of pipe or long chambers are used to provide some noise attenuation benefit).

In this embodiment, the inlet 13 communicates with the inner chamber 31 and the outlet 15 communicates with the outer chamber 33. However, other configurations may be implemented; for example, the inlet 13 may communicate with the outer chamber 33 and the outlet 15 may communicate with the inner chamber 31.

In the arrangement shown, the inlet 13 is provided on one side wall 21 of the shell 20 and the outlet 15 is provided on the outer peripheral wall 22 of the shell. More particularly, said one side wall 21 has an opening therein communicating with an adjacent portion of the inner chamber 31 to provide the inlet 13. The cross-sectional area of the opening is smaller than the cross-sectional area of the portion of the inner chamber 31 with which it communicates, as can be seen in the drawings.

However, other configurations may be contemplated. For example, the inlet 13 and the outlet 15 may each be provided on a side wall 21 of the shell 20, either on the same side wall or on different side walls. In other words, the outlet 15 may be provided on one of the side walls 21 of the shell 20 instead of on the outer peripheral wall 22; either on the same side wall as the inlet 13 or on the other side wall.

The inner chamber 31 into which the inlet 13 opens is of a larger volume than the other chambers. This is for the purpose of encouraging flow of engine exhaust gas into the muffler 10.

The chambers 17 are so configured that adjacent chambers are in communication one with another for exhaust gas flow from the inlet 13 to the outlet 15 via flow passages 50. There may be more than one flow passage 50 providing flow communication between adjacent chambers.

In the arrangement shown, the flow passages 50 comprise a series of flow passages 51, 52, 53 as will be described in more detail later.

In particular, the inner chamber 31 communicates with first intervening chamber 35a by way of at least one flow passage 51. In the arrangement shown, the inner chamber 31 communicates with first intervening chamber 35a by way of two flow passages 51. The two flow passages 51 comprise two openings 51a, 51b in internal wall 27a, which is the common wall between the inner chamber 31 and the first intervening chamber 35a. The two openings 51a, 51b are disposed in opposed relation in internal wall 27a, as shown in the drawings.

Further, first intervening chamber 35a communicates with second intervening chamber 35b by way of at least one flow passage 52. In the arrangement shown, the first intervening chamber 35a communicates with second intervening chamber 35b by way of two flow passages 52. The two flow passages 52 comprise two openings 52a, 52b in internal wall 27b, which is the common wall between the first intervening chamber 35a and the second intervening chamber 35b. The two openings 52a, 52b are disposed in opposed relation in internal wall 27b, as shown in the drawings. Further, the two openings 52a, 52b in internal wall 27b are offset from the two openings 51a, 51b in internal wall 27a. In the arrangement shown, openings 52a, 52b in internal wall 27b are angularly offset from the two openings 51a, 51b in internal wall 27a by 90 degrees, as can be seen in the drawings. This is to optimise flow of exhaust gas within first intervening chamber 35a before it exits through the two openings 52a, 52b into the second intervening chamber 35b. Having the openings 51a, 51b and 52a, 52b arranged in this offset manner also forces the exhaust gas flow to undergo a directional change as it progresses from one chamber to the next, this directional change being beneficial for improved noise attenuation effect. Multiple directional changes in the exhaust gas flow through the chambers 17 of the muffler 10 assists in providing the noise attenuation benefits of the muffler.

Still further, second intervening chamber 35b communicates with the outer chamber 33 by way of at least one flow passage 53. In the arrangement shown, the second intervening chamber 35b communicates with the outer chamber 33 by way of two flow passages 53. The two flow passages 53 comprise two openings 53a, 53b in internal wall 27c, which is the common wall between the second intervening chamber 35b and the outer chamber 33. The two openings 53a, 53b are disposed in opposed relation in the internal wall 27c, as shown in the drawings. Further, the two openings 53a, 53b in internal wall 27c are offset from the two openings 52a, 52b in internal wall 27b. In the arrangement shown, openings 53a, 53b in internal wall 27c are angularly offset from the two openings 52a, 52b in internal wall 27b by 90 degrees, as can be seen in the drawings. This is to optimise flow of exhaust gas within second intervening chamber 35b before it exits through the two openings 53a, 53b into the outer chamber 33. Furthermore, this offset arrangement of openings 52a, 52b and 53a, 53b forces the exhaust gas flow to undergo another directional change as it progresses from one chamber to the next, providing further noise attenuation benefits.

Similarly, the outlet 15 is angularly offset from the two openings 53a, 53b in internal wall 27c, presenting yet another directional change for the flow of exhaust gas as it moves through the successive chambers 17 of the muffler 10.

Together, the multiple annular circuit direction changes, and the long flow path for the exhaust gas as it flows through the successive chambers 17, enables good noise attenuation (i.e. a muffler with low noise output) in a compact package.

The arrangement described and illustrated in this embodiment features two flow passages 51, two flow passages 52 and two flow passages 53, with the various flow passages being disposed in offset relation to create a long flow path from the inlet 13 to the outlet 15 incorporating various directional changes. Other arrangements are, of course, possible. By way of example, there may be an embodiment featuring only one flow passage 51, one flow passage 52 and one flow passage 53, with the various flow passages disposed in offset relation to create a long flow path from the inlet 13 to the outlet 15. The offset relation may be such that flow passage 52 would be diametrically opposed to flow passage 51, and flow passage 53 would be diametrically opposed to flow passage 52.

The flow passages 50 permitting exhaust gas flow between two adjacent chambers 17 have a combined cross-sectional flow area greater than the cross-sectional flow area of the outlet 15 through which exhaust gas is discharged from the muffler 10. By way of example, in this embodiment where flow passage 51 comprises two openings 51a, 51b in internal wall 27a between inner chamber 31 and the first intervening chamber 35a, the combined cross-sectional flow area would be the sum of the cross-sectional flow areas of the two openings 51a, 51b and this combined cross-sectional flow area would be greater than the cross-sectional flow area of the outlet 15. Similar considerations would apply to the flow passage 52 comprising the two openings 52a, 52b in internal wall 27b between the first intervening chamber 35a and the second intervening chamber 35b. Additionally, similar considerations would also apply to the flow passage 53 comprising the two openings 53a, 53b in internal wall 27c between the second intervening chamber 35b and the outer chamber 33.

Sizing of the cross-sectional flow areas of the various flow passages 50 between adjacent chambers 17 relative to the cross-sectional flow area of the outlet 15 is to provide a degree of redundancy for the purpose of avoiding an adverse effect on performance of an engine fitted with the muffler 10 through normal accumulation of deposits within the flow passages 50.

Each intervening chamber 35 presents several internal flow paths for exhaust gas flowing through the chamber. In the arrangement shown, each intervening chamber 35 presents four notional internal flow paths depicted generally by reference numeral 60.

Figure 4A:
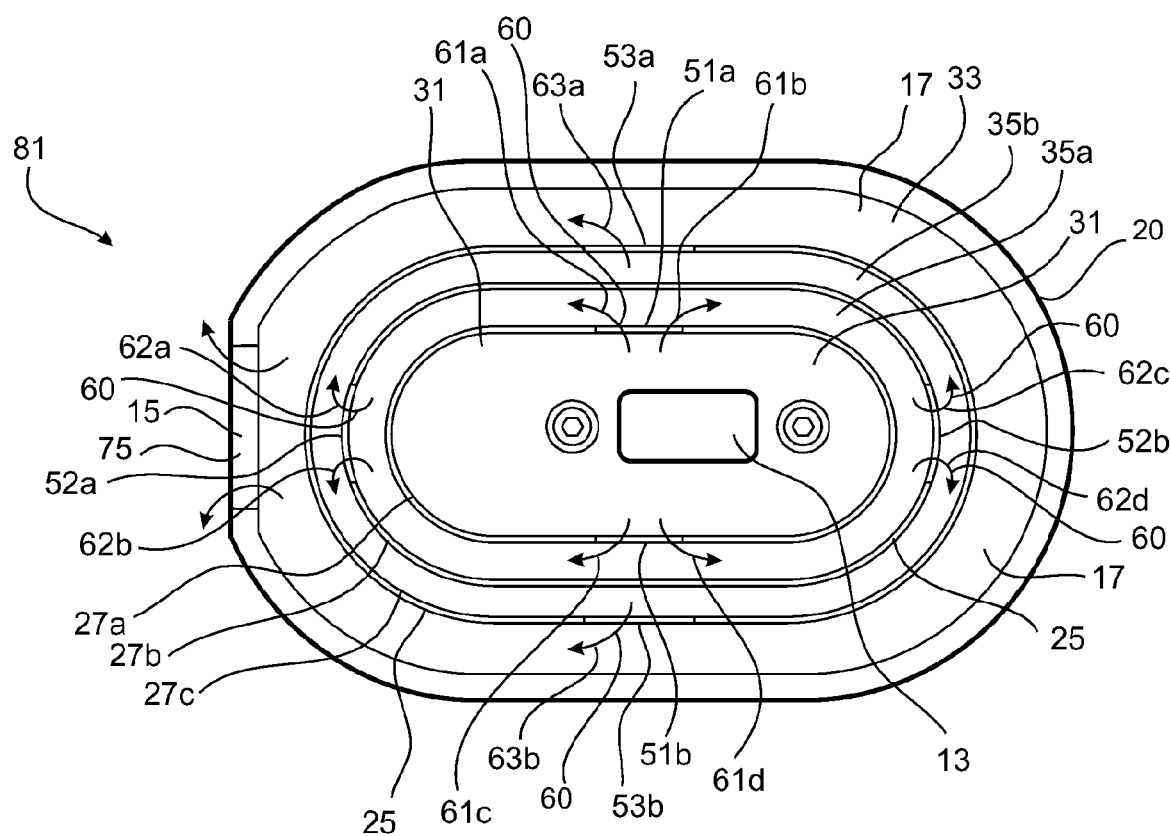
FIG. 4A is a view similar to FIG. 4, except on an enlarged scale.

Specifically, first intervening chamber 35a presents two flow paths from opening 51a in internal wall 27a to the two openings 52a, 52b in internal wall 27b, as depicted by the flow lines shown in FIGS. 4 and 4A, and identified by reference numerals 61a, 61b. Further, first intervening chamber 35a presents two further flow paths from opening 51b in internal wall 27a to the two openings 52a, 52b in internal wall 27b, as depicted by the flow lines shown in FIGS. 4 and 4A, and identified by reference numerals 61c, 61d.

Similarly, second intervening chamber 35b presents two flow paths from opening 52a in internal wall 27b to the two openings 53a, 53b in internal wall 27c, as depicted by the flow lines shown in FIGS. 4 and 4A, and identified by reference numerals 62a, 62b. Further, second intervening chamber 35b presents two further flow paths from opening 52b in internal wall 27b to the two openings 53a, 53b in internal wall 27c, as depicted by the flow line shown in FIGS. 4 and 4A, and identified by reference numerals 62c, 62d.

Similarly, the outer chamber 33 presents a flow path from opening 53a in internal wall 27c to the outlet 15, as depicted by the flow lines shown in FIGS. 4 and 4A, and identified by reference numerals 63a. Further, the outer chamber 33 presents a further flow path from opening 53b in internal wall 27c to the outlet 15, as depicted by the flow lines shown in FIGS. 4 and 4A, and identified by reference numerals 63b. There is confluence of the two flow paths 63a, 63b in the region of the outer chamber 33 adjacent the outlet 15.

The combined cross-sectional flow area of the flow paths 60 in each intervening chamber 35 is greater than the cross-sectional flow area of the outlet 15 through which exhaust gas is discharged from the muffler. By way of example, the combined cross-sectional flow area in chamber 35a would be the sum of the cross-sectional flow areas of the four flow paths 61a to 61d, and this combined cross-sectional flow area is greater than the cross-sectional flow area of the outlet 15. Similarly, the combined cross-sectional flow area in chamber 35b would be the sum of the cross-sectional flow areas of the four flow paths 62a to 62d, and this combined cross-sectional flow area is greater than the cross-sectional flow area of the outlet 15.

Further, the combined cross-sectional flow area of the internal flow paths 63a, 63b within the outer chamber 33 from the two openings 53a, 53b in internal wall 27c to the outlet 15 is also greater than the cross-sectional flow area of the outlet 15.

Sizing of the cross-sectional flow areas of the internal flow paths 60 within the various muffler chambers 17 relative to the cross-sectional flow area of the outlet 15 affords a level of redundancy for the purpose of avoiding an adverse effect on performance of an engine fitted with the muffler 10 through normal accumulation of deposits within the muffler chambers.

In this embodiment, the outlet 15 comprises a single outlet opening 71. In the arrangement shown, the outlet opening 71 is defined within an outlet orifice plate 73 adapted to be mounted onto the shell 20 in registration with an aperture 75 provided in the shell 20 and surrounded by a flanged mounting portion 77. The outlet orifice plate 73 is removably mounted onto the shell 20 in registration with the aperture 75 to permit it to be readily changed if there is a requirement for a change in the cross-sectional flow area of the outlet 15. Further, the removable nature of the outlet orifice plate 73 facilities access to the outlet 15 and surrounding regions for cleaning to remove any accumulated deposits, should this be required. Cleaning of the outlet 15 of the muffler 10 is also facilitated by virtue of the outlet orifice plate 73 being configured as a short, external outlet restriction which makes any removal of accumulated deposits in this region practical and easily done. Furthermore, the combination of a short exit orifice (effectively provided by the outlet orifice plate 73) with the relatively large cross-sectional flow areas of the internal flow paths within the various muffler chambers together facilitate a muffler design which has low deposit sensitivity.

The cross-sectional flow area of the outlet 15 is sized to provide a selected restriction to discharge of exhaust gas from the muffler 10. The cross-sectional flow area of the outlet may be selected having regard to required engine performance and/or noise attenuation requirements.

In this embodiment, the body 11 is of two-part construction, comprising first and second parts 81, 82 adapted to mate at parting line 83 and be releasably fastened together by fasteners 85. The first and second parts 81, 82 have joining flanges 87 which abut at the parting line 83 and are connected together by the fasteners 85. Each part 81, 82 defines a portion of the shell 20 and respective portions of the various internal walls 27.

Figure 5:
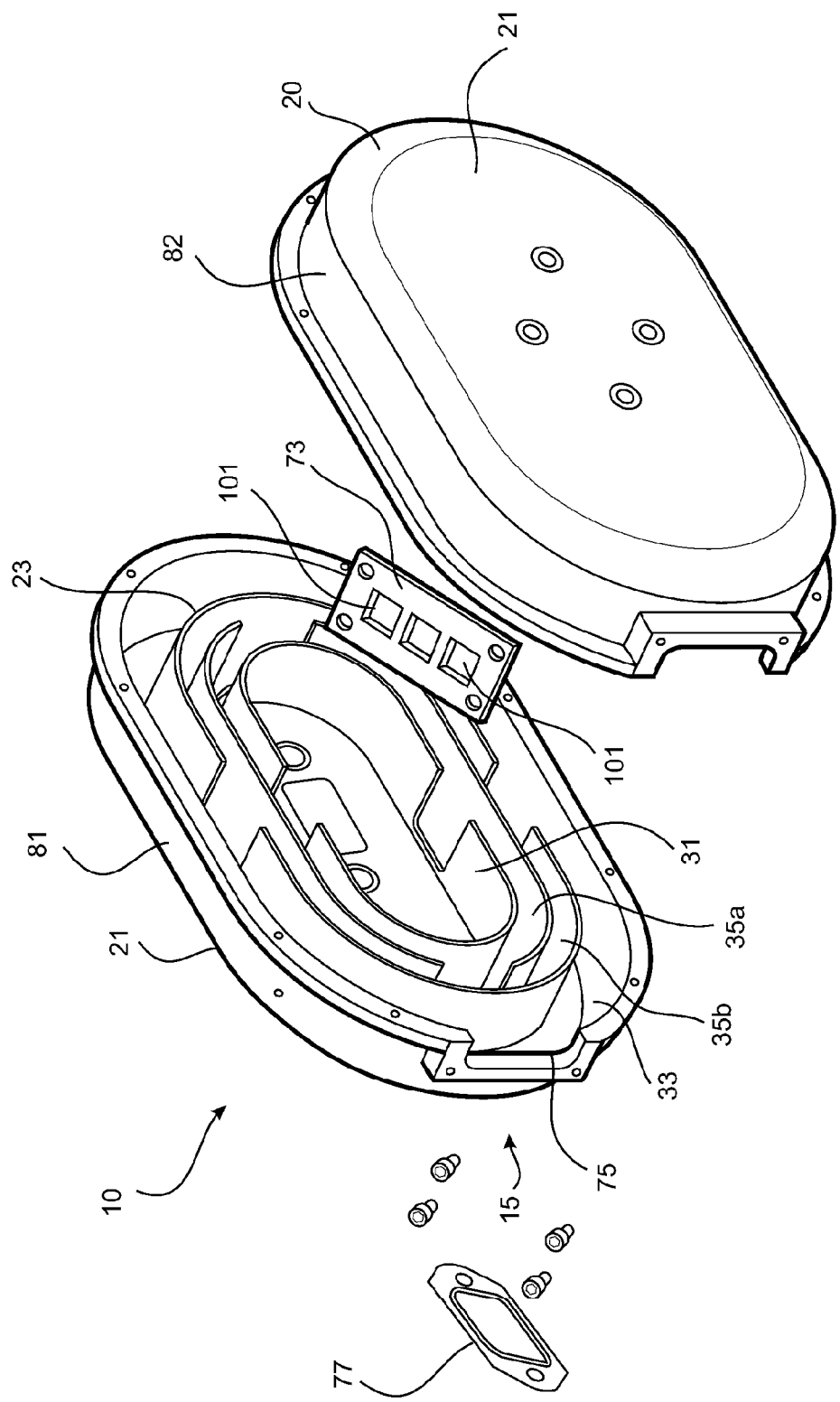
FIG. 5 is an exploded perspective view of a second embodiment of the muffler.

Referring to FIG. 5, there is shown a second embodiment of a muffler 10 according to the invention. The second embodiment is similar in many respects to the first embodiment and so similar reference numerals are used to denote similar parts.

In this second embodiment, the outlet 15 comprises a plurality of outlet openings 101 rather than a single outlet opening as was the case in the first embodiment. The outlet openings 101 are provided in an outlet orifice plate 73 adapted to be mounted onto the shell 20, as was the case in the first embodiment.

Referring to FIGS. 6 to 9, there is shown a third embodiment of a muffler 10 according to the invention. The third embodiment is similar in many respects to the first embodiment and so similar reference numerals are again used to denote similar parts.

In this third embodiment, the intervening chambers 35 are configured to provide some control of the direction of flow of exhaust gases along internal flow paths 60 within the chambers 17. In the arrangement shown, the control is provided by the provision of partitions 100 within the two intervening chambers 35a, 35b. The partitions 100 effectively divide each chamber 35a, 35b into two sub-chambers, each of semi-annular configuration.

Figure 9:
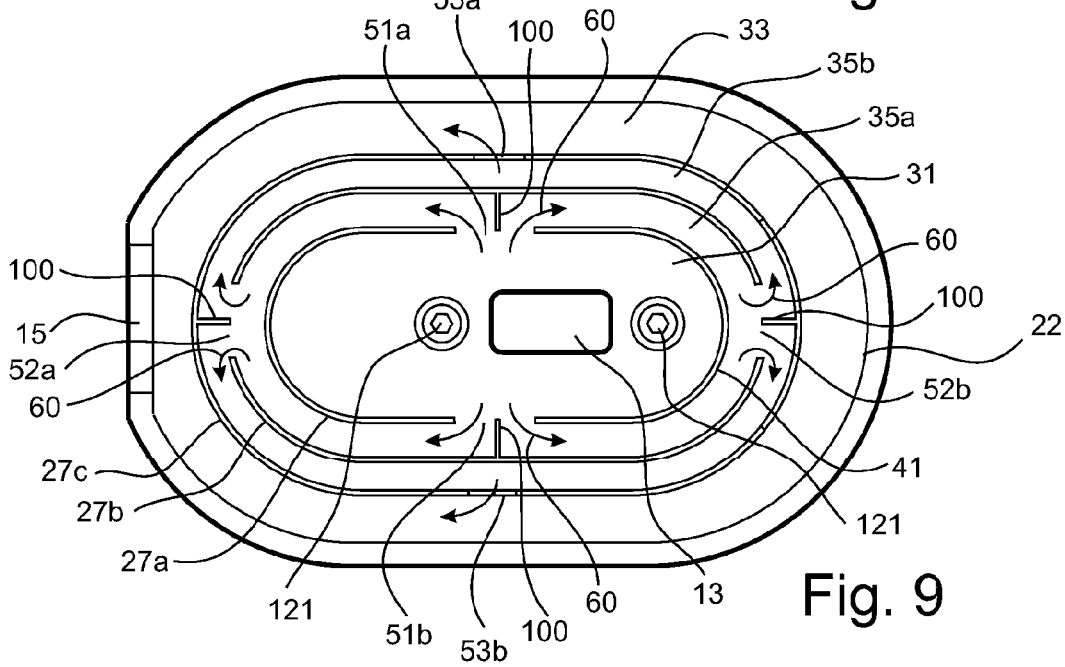
FIG. 9 is a side view of a part of the muffler, illustrating portions of internal chambers within the muffler.

In this embodiment, the partitions 100 are disposed at locations corresponding to the flow passages 50 through which exhaust gas enters the respective chamber 35a, 35b, as best seen in FIG. 9. Specifically, chamber 35a has two partitions 100, each extending from internal wall 27b towards a respective one of the two flow passages 51. The two flow passages 51 comprise the two openings 51a, 51b in internal wall 27a between inner chamber 31 and the first intervening chamber 35a, as best seen in FIG. 9. Similarly, chamber 35b has two partitions 100, each extending from internal wall 27c towards a respective one of the two flow passages 52. Again, the two flow passages 52 comprise the two openings 52a, 52b in internal wall 27b between the first intervening chamber 35a and the second intervening chamber 35b.

The presence of the partitions 100 serves to direct flow of exhaust gases along internal flow paths 60 within the chambers 35a, 35b, as shown in FIG. 9. More particularly, respective partitions 100 serve to split exhaust outflow through the openings 51a, 51b into two divergent flow paths 60 along the chamber 35a. Similarly, respective partitions 100 serve to split exhaust outflow through the openings 52a, 52b into two divergent flow paths 60 along the chamber 35b.

Figure 6:
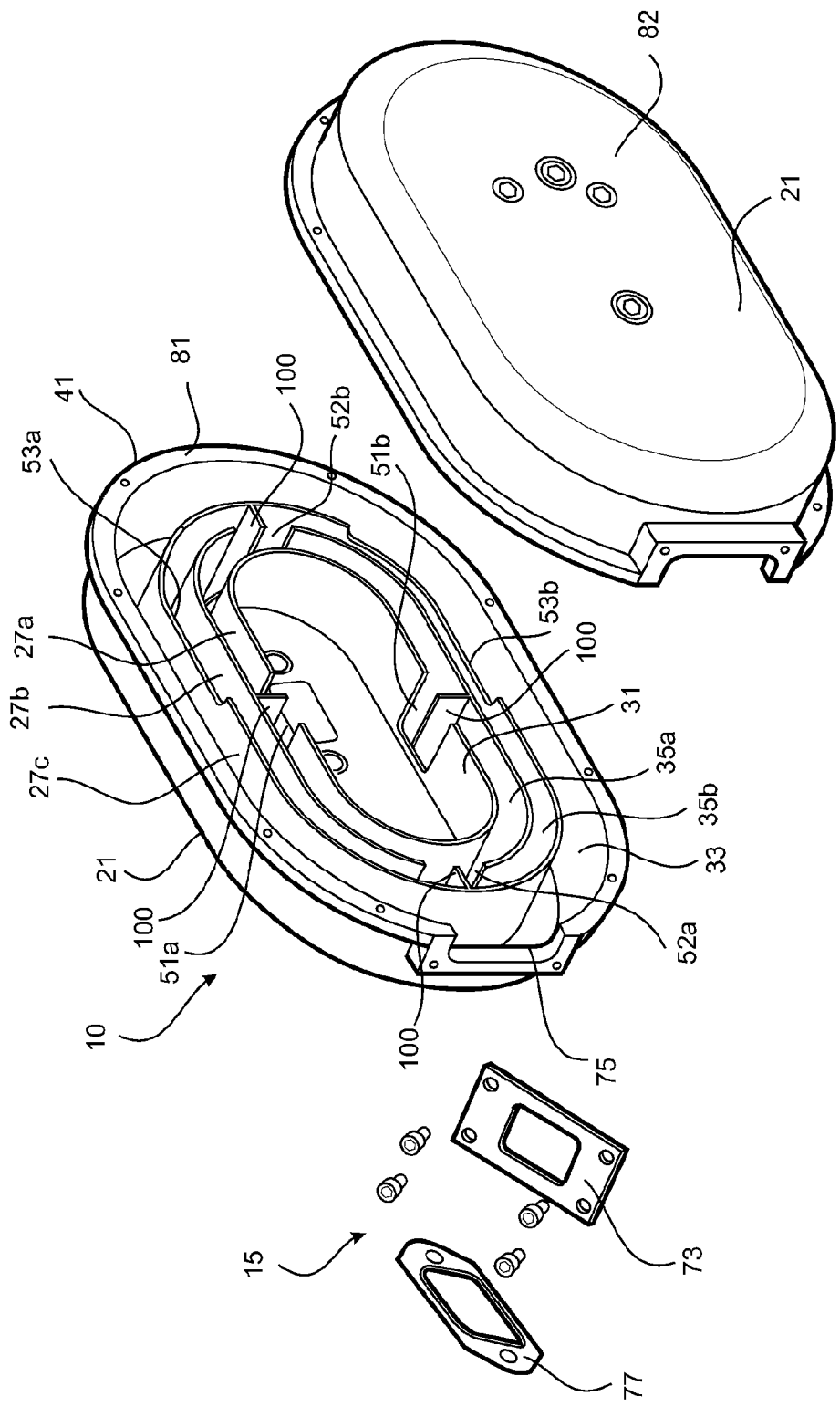
FIG. 6 is an exploded perspective view of a third embodiment of the muffler.
Figure 7:
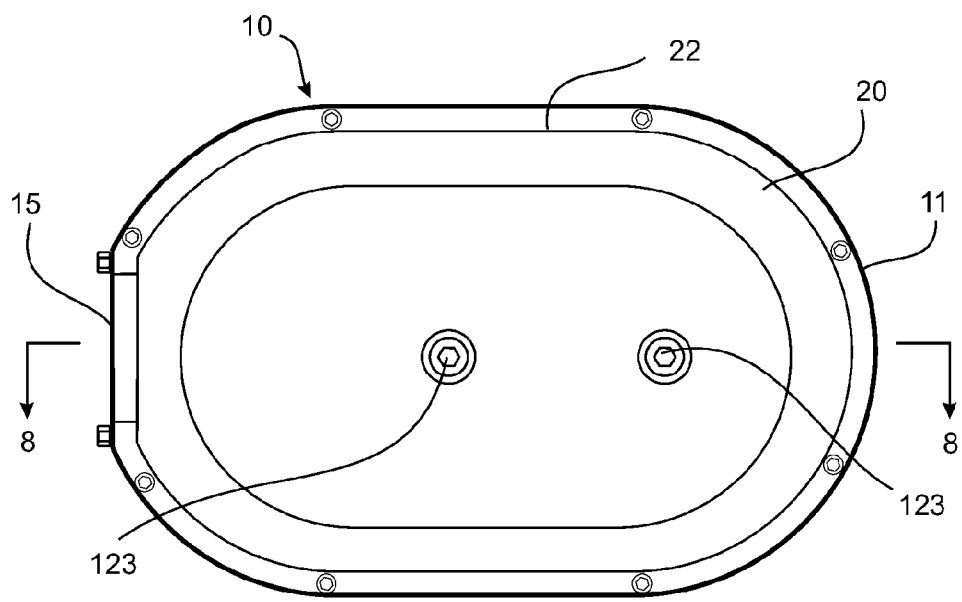
FIG. 7 is a side view of the muffler shown in FIG. 6.
Figure 8:
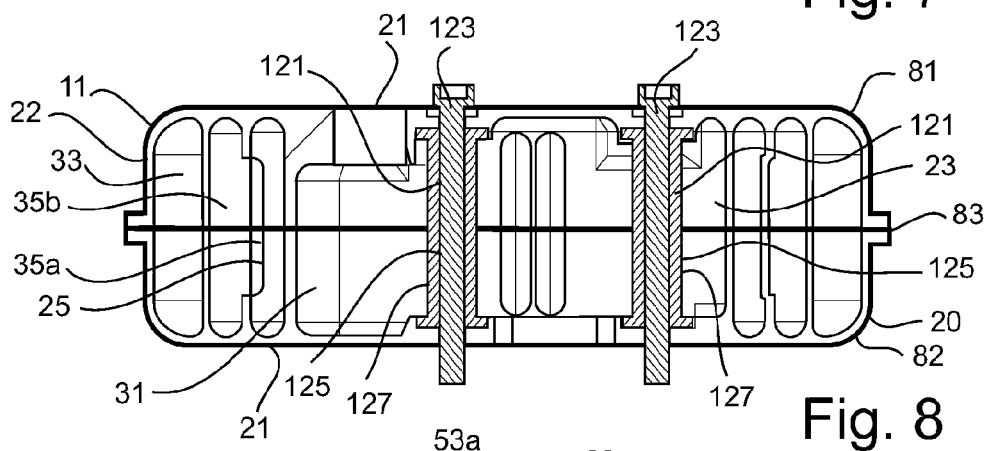
FIG. 8 is a sectional view along line 8-8 of FIG. 7.

The second intervening chamber 35b communicates with the outer chamber 33 by way of two flow passages 53, as was the case with the previous embodiments. The two flow passages 53 comprise two openings 53a, 53b in internal wall 27c, which is the common wall between the second intervening chamber 35b and the outer chamber 33, again as was the case with the previous embodiments. In this embodiment, each opening 53a, 53b in internal wall 27c is configured differently from previous embodiments. More particularly, each opening 53a, 53b is configured as an elongate recess in the internal wall 27c. Each opening 53a, 53b in this embodiment is relatively long and thin (as best seen in FIG. 6), as compared to the corresponding openings 53a, 53b in the previous embodiments which are shorter and extend further into the internal wall 27c. The recesses defined by the respective openings 53a, 53b exist in counterpart in the first and second parts 81, 82 of the body 11, whereby when the two parts 81, 82 are brought together to define the shell 20, counterpart recesses cooperate to form an elongated slot which provides the respective flow passage 53.

Further, in the arrangement illustrated, the muffler 10 has mounting holes 121 for receiving mounting bolts 123 for mounting the muffler onto an engine, with the inlet communicating with the exhaust outlet of the engine. The mounting holes 121 are disposed on opposed sides of the inlet 13 and extend through the body 11, passing through the shell 21 and the inner chamber 31, as best seen in FIG. 9.

The mounting holes 121 extend through internal spacers 125 provided within the hollow interior 23. The internal spacers 125 provide internal reinforcement against loadings imposed upon the body 11 by the bolts 123 when tightened. The internal spacers 125 are configured as reinforcing sleeves 127 extending between the first and second parts 81, 82 of the body 11.

Figure 10:
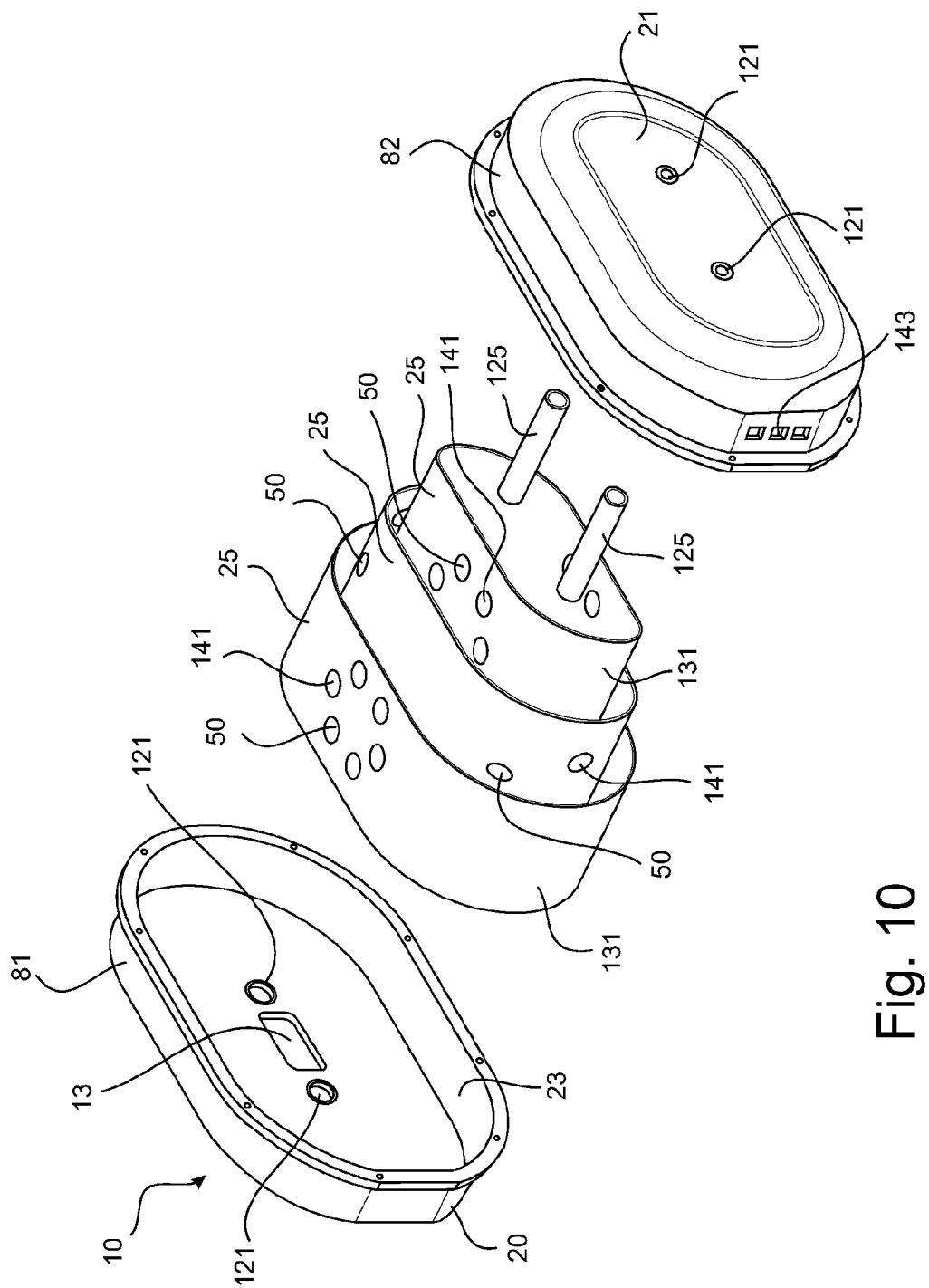
FIG. 10 is an exploded perspective view of a fourth embodiment of the muffler.
Figure 11:
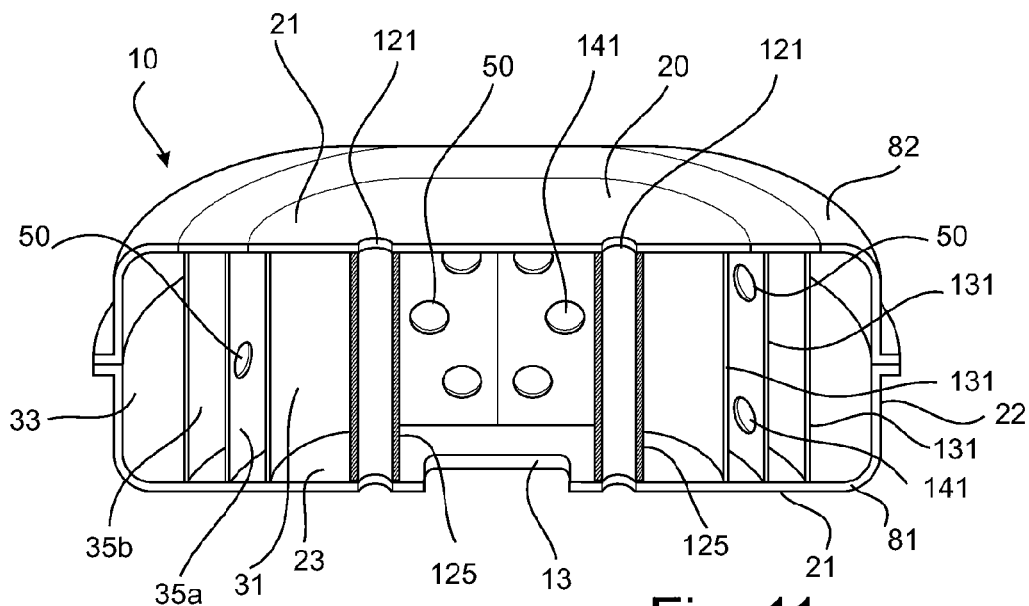
FIG. 11 is a sectional perspective view of the muffler of FIG. 10.

Referring to FIGS. 10 and 11, there is shown a fourth embodiment of a muffler 10 according to the invention. The fourth embodiment is similar in many respects to the first embodiment and so similar reference numerals are once again used to denote similar parts.

In this fourth embodiment, the portions 25 within the hollow interior 23 defining the internal walls 27 comprise elements 131 which are formed separately of the shell 21 and which are configured as inserts receivable within the shell. The shell 20 has provision (not shown) for positively locating the elements 131 in position within the hollow interior 23 to define the various chambers 17. Such provision may, for example, comprise formations (such as for example slots) provided internally on the side walls 21 of the shell 20, into which edge portions of the elements 131 can be received and positively retained.

The arrangement involving provision of the elements 131 separately of the shell 21 and configured as inserts receivable within the shell may offer certain advantages. Firstly, the arrangement may be conducive to construction of the shell 20 and the elements 131 from different materials. Secondly, the arrangement may allow selection of different wall materials and/or wall thicknesses between the various chambers 17.

The elements 131 themselves may all be of the same material, or at least some of the elements 131 may be of different materials.

The elements 131 may, of course, be formed of the same material as the shell 20. However, the provision of at least some, and preferably all, of the elements 131 of different materials from the shell 20 may provide some thermal isolation of the internal walls 27 from the shell 20. Thermally isolating the internal walls 27 from the shell 20 may be beneficial in terms of reduced accumulation of exhaust deposits within the various chambers 17 of the muffler 10.

Adoption of different materials, and/or different wall thicknesses, may allow the design operating temperature within the muffler 10 to be manipulated according to selected criteria to achieve a "burn-off" temperature quickly, thereby inhibiting accumulation of exhaust deposits within the chambers 17. By way of example, the shell 20 may be formed of a cast material such as a metal alloy, and the elements 131 may be of a different material, such as for example stainless steel which can "run hotter" and thereby facilitate deposit "burn-off".

This fourth embodiment comprises a plurality of flow passages 50 providing flow communication between adjacent chambers 17. In the arrangement illustrated, the flow passages 50 between adjacent chambers 17 comprise a set of holes 141. The set of holes 141 provides a plurality of flow openings operating in concert. This may be advantageous over a single flow opening, as the arrangement provides a larger cumulative perimeter and thereby affords better noise attenuation for the same amount of backpressure within the muffler 10.

In this fourth embodiment, the outlet 15 comprises a plurality of outlet openings 143.

Figure 12:
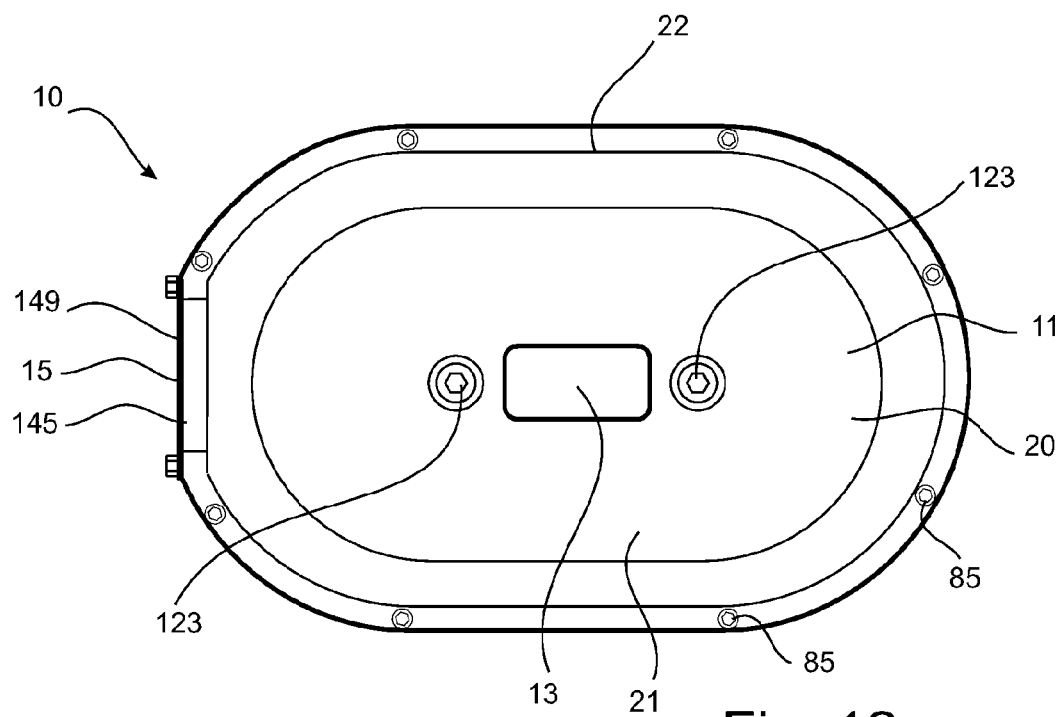
FIG. 12 is a side view of a fifth embodiment of the muffler.
Figure 13:
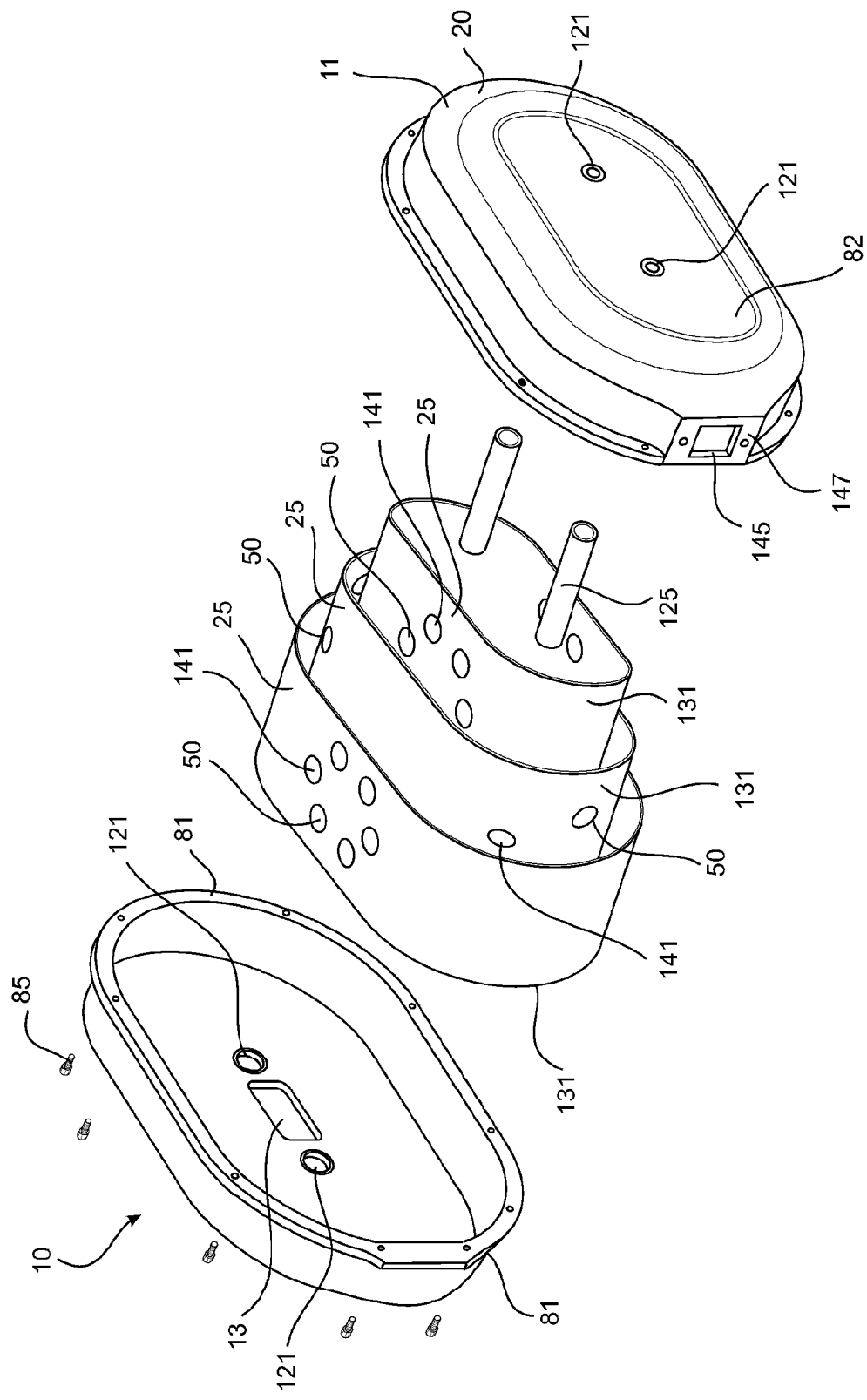
FIG. 13 is an exploded perspective view of the muffler of FIG. 12.

Referring to FIGS. 12 and 13, there is shown a fifth embodiment of a muffler 10 according to the invention. The fifth embodiment is similar in many respects to the fourth embodiment and so similar reference numerals are again used to denote similar parts.

In this fifth embodiment, the outlet 15 comprises an aperture 145 provided in the shell 20 and surrounded by a flanged mounting portion 147. An outlet orifice plate 149 is removably mounted onto the shell 20 in registration with the aperture 145 to permit it to be readily changed if there is a requirement for a change in the cross-sectional flow area of the outlet 15. Further, the removable nature of the outlet orifice plate 149 facilitates access to the outlet 15 and surrounding regions for cleaning to remove any accumulated deposits.

In a further embodiment, which is not shown, the muffler 10 may have an exhaust outlet configured as a venturi. The provision of the venturi may be beneficial in terms of noise attenuation. Otherwise, this further embodiment may have any or all of the features of any one of the previous embodiments.

The foregoing disclosure is intended to explain how to fashion and use various embodiments in accordance with the invention, rather than to limit the true, intended, and fair scope and spirit of the invention. The foregoing description is not intended to be exhaustive, nor to be limited to the precise forms disclosed. Features described in relation to one embodiment may, as appropriate, be implemented in any one of the other embodiments, as would be understood by a person skilled in the art.

Further, it should be appreciated that various modifications can be made without departing from the principles of the invention. Therefore, the invention should be understood to include all such modifications within its scope. For example, in each of the embodiments discussed hereinbefore, the muffler 10 is configured such that the body 11 is of two-part construction, comprising first and second parts 81, 82 releasably fastened together by fasteners. 85. Other arrangements may, however, also be possible for the muffler 10, including for example the first and second parts 81, 82 being joined together by way of welding or other known bonding methods. Similarly, different means may be employed to affix the muffler 10 to the engine; for example, by way of a suitably arranged short exhaust pipe, in which case features such as the internal spacers 125 and bolts 123 may be arranged differently or in fact may not be required.

A further example of a modification which is within the scope of the present invention may be in respect of the provision of specifically located drain holes within the muffler 10 arranged to facilitate the draining or removal of any liquid which may enter or develop within the muffler 10. Such drain holes could, for example, be arranged within the internal walls which divide the chambers 17 to encourage the flow of any liquid to the outlet 15. Furthermore, the outlet 15 could be so located when the muffler 10 is installed on an engine as to be at a lower point than the drain holes. To minimise any impact on noise creation, the drain holes may not necessarily be located in the internal walls one beneath another, but more preferably be arranged in a staggered pattern to still encourage liquid draining without severely impacting on noise attenuation. In another arrangement, the need for such drain holes may be able to be avoided by instead ensuring that the flow passages 50 themselves between adjacent muffler chambers 17 are arranged to facilitate the flow of liquid downwardly towards a suitably located outlet 15 (i.e. again arranged to be at a low point once the muffler 10 is installed on a corresponding engine).

Reference to any positional descriptions, such as "inner", "outer", "top", "bottom" and "side", are to be taken in context of the embodiments depicted in the drawings, and are not to be taken as limiting the invention to the literal interpretation of the term but rather as would be understood by the skilled addressee.

Additionally, where the terms "system", "device", and "apparatus" are used in the context of the invention, they are to be understood as including reference to any group of functionally related or interacting, interrelated, interdependent or associated components or elements that may be located in proximity to, separate from, integrated with, or discrete from, each other.

Throughout this specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A muffler comprising a body defining a plurality of chambers disposed one about another, the plurality of chambers being defined between two opposed side walls, each chamber being separated from a respective adjacent chamber by a common wall therebetween, an inlet for delivery of exhaust gas into one of the chambers and an outlet for discharge of exhaust gas from another of the chambers, adjacent chambers being interconnected for exhaust gas flow from the inlet to the outlet, the plurality of chambers comprising an inner chamber and an outer chamber, an opening in one side wall, the opening being aligned with and communicating directly with an adjacent portion of the inner chamber, the cross-sectional area of the opening being smaller than the cross-sectional area of the portion of the inner chamber with which it communicates, wherein the inlet or the outlet comprises the opening, each chamber communicating with a respective adjacent chamber for exhaust gas flow therebetween through one or more flow passages in the respective common wall between the two adjacent chambers, the one or more flow passages in each common wall having a combined cross-sectional flow area greater than the cross-sectional flow area of the outlet through which exhaust gas is discharged, and wherein the body has length, breadth and depth dimensions, the depth dimension being smaller than the length and breadth dimensions, and the depth dimension being less than half the breadth dimension.

2. The muffler according to claim 1 further comprising one or more intervening chambers disposed between the inner and outer chambers.

3. The muffler according to claim 1 wherein each chamber configured to surround another chamber is of annular formation.

4. The muffler according to claim 1 wherein the inner chamber comprises a closed volume defined by a peripheral wall.

5. The muffler according to claim 2 wherein the outer chamber comprises an annular chamber surrounding the inner chamber and wherein any intervening chambers are also annular chambers.

6. The muffler according to claim 1 wherein the inlet and outlet each respectively communicate with one of the inner and outer chambers.

7. The muffler according to claim 6 wherein the inlet communicates with the inner chamber and the outlet communicates with the outer chamber.

8. The muffler according to claim 1 wherein the chamber into which the inlet opens is of a larger volume than the other chambers.

9. The muffler according to claim 1 wherein each flow passage permitting exhaust gas flow between two adjacent chambers comprises a plurality of flow openings operating in concert.

10. The muffler according to claim 9 wherein the flow passage(s) at which exhaust gas enters a respective chamber are offset from the flow passage(s) at which the exhaust gas leaves that chamber.

11. The muffler according to claim 1 wherein each chamber presents one or more internal flow paths for exhaust gas flowing through the chamber, wherein the combined cross-sectional flow area of the one or more internal flow paths is greater than the cross-sectional flow area of the outlet through which exhaust gas is discharged from the muffler.

12. The muffler according to claim 1 wherein the body comprises a shell defining a hollow interior, and portions within the hollow interior to define internal walls between the chambers.

13. The muffler according to claim 12 wherein the shell defining the hollow interior, and the portions within the hollow interior to define internal walls between the various chambers, comprise an integrated assembly.

14. The muffler according to claim 12 wherein the portions within the hollow interior of the shell defining internal walls between the various chambers comprise elements which are formed separately of the shell and which are configured as inserts receivable within the shell.

15. The muffler according to claim 12 wherein at least one of the portions defining the internal walls is thermally isolated from the shell.

16. The muffler according to claim 15 wherein all of the portions defining the internal walls are thermally isolated from the shell.

17. The muffler according to claim 12 wherein the shell is of two-part construction adapted to be assembled together.

18. The muffler according to claim 1 wherein the body is configured to present a compact profile for installation on an engine.

19. The muffler according to claim 18 wherein the body is configured to present a flat or squat profile.

20. The muffler according to claim 1 wherein the depth dimension is up to about one-quarter of the breadth dimension.

21. A muffler comprising a body defining an inlet for receiving exhaust gas, an outlet for discharge of exhaust gas, an inner chamber, an outer chamber and at least one intervening chamber between the inner and outer chambers, the intervening chamber(s) and the outer chamber being configured as annular chambers disposed about the inner chamber, adjacent chambers being separated by a common wall and interconnected for fluid communication by one or more flow passages in the common wall, the one or more flow passages in each common wall having a combined cross-sectional flow area greater than the cross-sectional flow area of the outlet through which exhaust gas is discharged, the chambers being defined between two opposed side walls, one side wall having an opening therein communicating with an adjacent portion of the inner chamber, the cross-sectional area of the opening being smaller than the cross-sectional area of the portion of the inner chamber with which it communicates, wherein the inlet or the outlet comprises the opening, and wherein the body has length, breadth and depth dimensions, the depth dimension being smaller than the length and breadth dimensions, and the depth dimension being less than half the breadth dimension.

22. A muffler comprising a body defining an inlet for receiving exhaust gas, an outlet for discharge of exhaust gas, an inner chamber, an outer chamber and at least one intervening chamber between the inner and outer chambers, the intervening chamber(s) and the outer chamber being configured as annular chambers disposed about the inner chamber, adjacent chambers are separated by a respective common wall and interconnected for fluid communication by one or more flow passages in the common wall, the one or more flow passages in each common wall having a combined cross-sectional flow area greater than the cross-sectional flow area of the outlet through which exhaust gas is discharged, wherein the body comprises a shell defining a hollow interior and portions within the hollow interior to define the common walls between the chambers, the shell comprising two opposed side walls between which the chambers are defined, one side wall having an opening therein communicating with an adjacent portion of the inner chamber, the cross-sectional area of the opening being smaller than the cross-sectional area of the portion of the inner chamber with which it communicates, wherein the inlet or the outlet comprises the opening, and wherein the body has length, breadth and depth dimensions, the depth dimension being smaller than the length and breadth dimensions, and the depth dimension being less than half the breadth dimension.

23. An internal combustion engine fitted with a muffler according to claim 1.

* * * * *